Patented June 24, 1930

1,766,822

UNITED STATES PATENT OFFICE

EMIL HUBERT, LUDWIG LOCK, AND OTTO LEUCHS, OF ELBERFELD, GERMANY, ASSIGNORS TO I. G. FARBENINDUSTRIE AKTIENGESELLSCHAFT, OF FRANKFORT, GERMANY

PROCESS FOR THE PREPARATION OF BODIES FROM ACIDYL CELLULOSES

No Drawing. Application filed April 17, 1925, Serial No. 23,961, and in Germany April 29, 1924.

It is known to prepare artifical silk by extruding solutions of acidyl celluloses through fine openings into salt solutions.

This method has, however, the great drawback that individual threads and even whole bundles of threads tend to break in the spinning process. Breakage occurs particularly at the point where the threads emerge from the salt solution.

The object of the present invention is to minimize or altogether to avoid the said breaking, by the use of a salt bath containing an addition of such substances as dissolve or swell the acidyl cellulose. The observation is surprising because it would be naturally assumed that the formed threads would hold better and break less easily, with more complete coagulation.

We have found, however, that the use of the more slowly precipitating bath formed by the addition to a salt solution of, for instance, acetone or alcohol or a mixture of both gives threads which break less easily than threads produced by the use of a pure salt solution. The thread remains more elastic and extensible, and better withstands the pull which the specifically heavier salt solution exerts upon it when it leaves the solution.

The most important acidyl cellulose is cellulose acetate. This is, for instance, dissolved in acetone or similar solvent to give a 15-25 per cent solution and a concentrated solution of calcium chloride may be used as the precipitating bath. Other suitable salt solutions may also be used. To these precipitating baths is added a suitable amount of acetone, in order to decrease the tendency towards breakage of the threads. In place of acetone, other suitable solvents or swelling agents for acidyl celluloses such as alcohols, formaldehyde solutions, mixtures of alcohol and acetone, mixtures of formaldehyde and acetone etc., may be used.

Example 1.—20 parts by weight of cellulose acetate are dissolved in 80 parts by weight of acetone or in a mixture of 75 parts by weight of acetone and 5 parts by weight of chlorbenzene. The solution is spun through 0.6 mm. diameter jets at a speed of 20–40 m. into a bath of calcium chloride of 23 per cent strength heated to 40–50°, to which acetone in quantity amounting to about 5 per cent of the bath has been added. Threads of about 2 deniers are thus obtained.

Example 2.—22 parts by weight of cellulose acetate are dissolved in 78 parts by weight of acetone or in a mixture of 73 parts by weight of acetone and 5 parts by weight of chlorobenzene. This solution is spun through jets of 0.4 mm. diameter at a speed of 25 m. into a precipitating bath heated to 40–50°, to which alcohol has been added, as for instance, a bath consisting of 50 parts by weight of a 35–40 per cent calcium chloride solution 30–40 parts by weight of alcohol and acetone in quantity amounting to 5 per cent of the bath.

Example 3.—A solution of cellulose acetate such as that used in Example 1, is spun through 0.6 mm. jets at a speed of 25 m. into a bath heated to 40–50° consisting of about 2 parts by weight of a 25 per cent calcium chloride solution and 1–2 parts by weight of 40 per cent formaldehyde solution.

We claim:—

1. Process for the preparation of bodies from acidyl celluloses by spinning solutions thereof into precipitating salt solutions characterized in that the spun acidyl cellulose solution is precipitated directly and in a single bath containing the precipitating salt and a substance which acts as a solvent or swelling agent for the acidyl cellulose.

2. Process for the preparation of bodies from acidyl celluloses by spinning solutions thereof into precipitating salt solutions characterized in that the spun acidyl cellulose solution is precipitated directly and in a single bath containing not less than about 10% of the precipitating salt and a substance which acts as a solvent or swelling agent for the acidyl cellulose.

3. Process for the preparation of bodies from fatty acid esters of cellulose by spinning solutions thereof into precipitating salt solutions characterized in that the spun solution of the fatty acid ester of cellulose is precipitated directly in a single bath containing the precipitating salt, a substance which acts as a solvent for the ester and a substance which acts as a swelling agent for the ester.

4. Process for the preparation of bodies from cellulose acetate by spinning solutions thereof into precipitating salt solutions characterized in that the spun cellulose acetate solution is precipitated directly in a single bath containing the precipitating salt, alcohol and acetone.

5. Process for the preparation of bodies from cellulose acetate by spinning solutions thereof into precipitating salt solutions characterized in that the spun cellulose acetate solution is precipitated directly in a single bath containing about 50 parts by weight of a 35–40% calcium chloride solution, 30–40 parts by weight of alcohol and 10–20 parts by weight of acetone.

In testimony whereof we have hereunto set our hands.

EMIL HUBERT.
LUDWIG LOCK.
OTTO LEUCHS.